3,332,847
ALMARCETIN AND ITS PRODUCTION BY STREPTOMYCES ALBUS

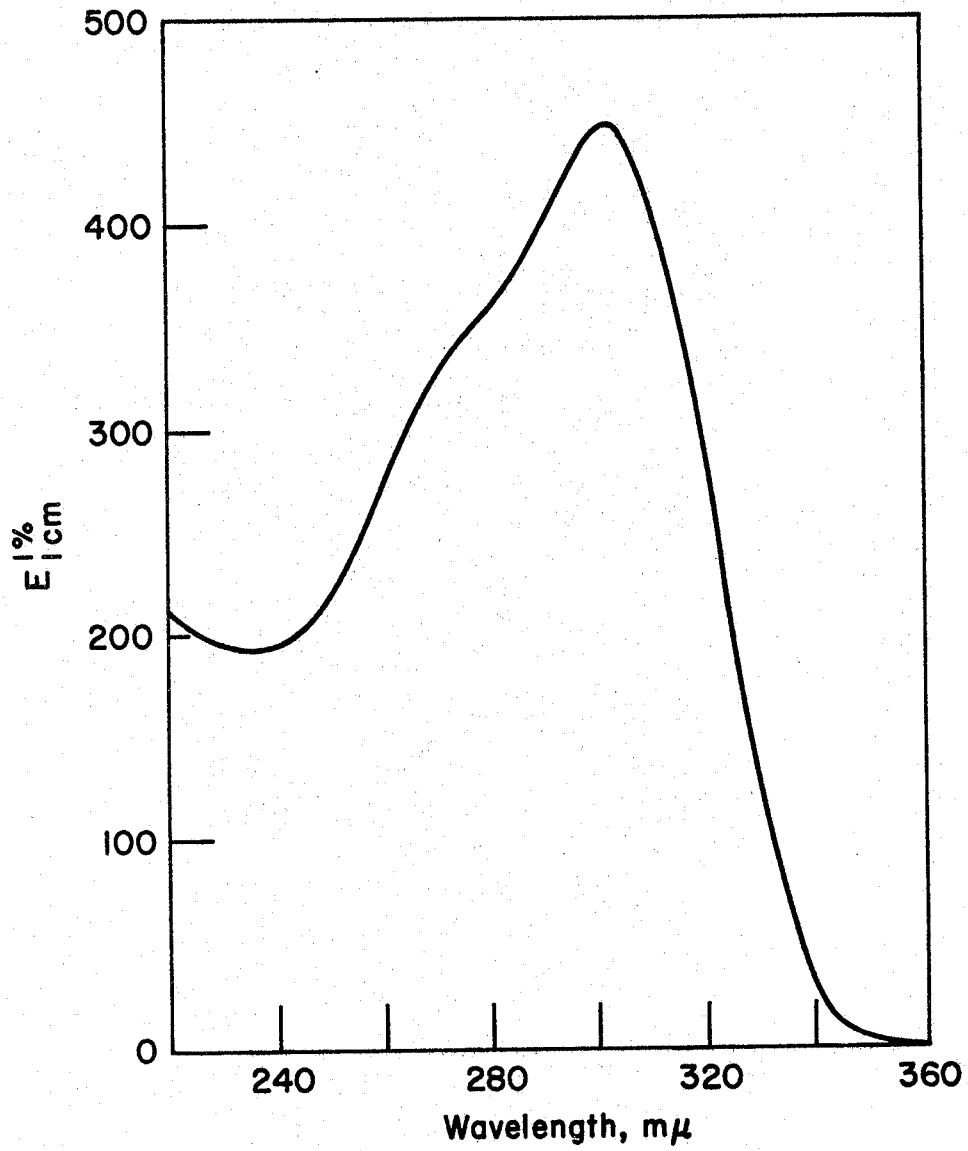

Marilyn J. Bachler, Peoria, Lloyd A. Lindenfelser, Tremont, and Odette L. Shotwell, Peoria, Ill., assignors to the United States of America as represented by the Secretary of Agriculture
Filed Dec. 8, 1964, Ser. No. 416,942
2 Claims. (Cl. 167—65)

A nonexclusive, irrevocable, royalty-free license in the invention herein described, throughout the world for all purposes of the United States Government, with the power to grant sublicenses for such purposes, is hereby granted to the Government of the United States of America.

This invention relates to a novel antimicrobial agent that is active in vitro against a broad spectrum of gram-negative bacteria as well as to some gram-positive bacteria, acid-fast bacteria, yeasts, and molds.

More particularly, this invention relates to our discovery of almarcetin, a novel antibiotic complex. Almarcetin is a dialyzable multi-factor acidic polypeptide complex having an absorption maximum at 300 m$\mu$ in water, which is present in the culture broth from fermentations of a particular strain of a subspecies of *Streptomyces albus*, viz. NRRL B–3141, which subspecies is characterized especially by the unique ability to form the almarcetin complex and morpholoically by spores that occur in coiled chains and have smooth to rough walls.

Almarcetin is produced in aerobic fermentations of *Streptomyces albus* subspecies NRRL B–3141 in a neutralized medium containing assimilable carbon and nitrogen sources. The fermentation broths were harvested at the end of 7 days, and the clear filtrates were subjected to adsorption on carbon, elution with 80 percent acetone, concentration, and lyophilization to provide a crude almarcetin complex having about 20 times the purity of the dried culture liquor solids. Alumina column chromatography of the redissolved crude almarcetin provided a five-fold increase in purity and activity over that of the carbon treated predecessor, and column chromatography of the alumina treated complex with weak and then strong cation exchange resins increased the purity and the antibiotic activity by about another 50 percent so that the almarcetin had a final purity about 225 times that of the dried culture liquor solids.

The purified almarcetin complex was found to be soluble in water, aqueous methanol, aqueous ethanol, and in aqueous acetone but only slightly soluble in absolute methanol and ethanol. It was insoluble in acetone and in ethyl acetate. At pH 3–9 solutions of the purified complex were stable for 30 minutes at 90° C. and stable at pH 7 for 24 hours at 25° C. but in strongly acidic or basic solutions, i.e., pH 3 or pH 9, almarcetin loses more than 10 percent of its activity in 24 hours at 25° C. Lyophilized preparations survived 4 months of storage at 5° C. with no loss of activity. The U.V. spectrum in water exhibits a maximum at 300 m$\mu$ ($E_1^{1\%}$ cm.= 450) and a very weak shoulder (apparently a trace of purine impurity) at 270 m$\mu$ ($E_1^{1\%}$ cm.=330) as shown in the drawing. As already indicated, the antibiotic spectrum of our novel antibiotic complex is unusual in its marked activity against the crown gall bacterium and to a lesser extent against a beam blight bacterium, as shown in Table I.

Although almarcetin moves as a single acidic substance during paper electrophoresis, paper chromatograms and bioautograms show that almarcetin is actually a complex composed mainly of two major factors arbitrarily designated as A and B and two very minor factors C and D. Factors A and B are interchangeably in equilibrium with one another as shown by the facts that each major factor always exists in the presence of the other and that when either major factor is separated from the other factors by paper chromatography, eluted from the paper chromatogram, and then rechromatographed, the new chromatogram always shows all of the factors regardless of how many times the procedure is repeated, thus suggesting that factors A and B may be either tautomers or perhaps a monomer and its dimer or some other multiple of a microbiologically active fundamental unit. The two minor factors C and D have not yet been extensively studied because of their low concentrations, but they may well be degradation products since they are always found in the presence of factors A and B. All of the almarcetin factors absorbed in the ultraviolet and were located on paper chromatograms with light whose wavelength was 253.7 m$\mu$. Almarcetin gives negative ninhydrin, Molisch, and ferric chloride tests and forms neither the picrate nor the 2,4-dinitrophenylhydrazone. Hydrolyzates of either factor A or factor B obtained from a paper chromatogram and then refluxed with 6 N HCl for 20 hours gave positive ninhydrin tests, and gave positive tests for the following amino acids: alanine, aspartic acid, glutamic acid, glycine, leucine, phenylalanine, serine, threonine, and valine.

The following example of a laboratory scale fermentation is not intended to limit the claims thereto inasmuch as the disclosed principles will readily enable one skilled in the art to make such obvious adjustments as may be required in a large scale fermentation.

Example 1

2800 ml. Fernbach flasks each containing a sterilized fermentation medium prepared by adding 10 grams of nonfat dry milk solids, 10 grams of peptone ("Protopentone No. 159," Wilson and Co., Chicago), and 20 grams of glucose to 1000 ml. of tap water were inoculated with 10 ml. of a 3-day old broth culture of *S. albus* subspecies NRRL B-3141 growing in the yeast extract medium of Pridham et al., Antibiot. Ann. 1956–1957:947 (1957). The pH was adjusted to 7.0 with NaOH and the flasks were placed on a rotary shaker operating at 200 r.p.m. After 7 days of fermentation at 28° C., the cultures were filtered, the combined clear filtrates (4 liters) stirred for 30 minutes with 40 grams (1% w./v.) of activated carbon and the latter collected by filtration using "Hyflo Super-Cel" (Johns-Manville) as filter aid. The carbon was then successively washed with water (2 liters), 80 percent methanol acidified with 1 ml. per 100 ml. of concentrated HCl (1 liter), and methanol (2 liters). The crude almarcetin was eluted from the carbon by stirring the carbon make for 30 minutes in about 1600 ml. of 80 percent acetone. The combined eluate and wash were concentrated in vacuo to less than 700 ml. to remove the acetone, and the concentrate lyophilized to yield 2.3 grams of crude almarcetin having 20 times the antibacterial activity of the dried culture liquor solids. A solution formed by dissolving 2.2 grams of the above crude almarcetin in 10 ml. of 80 percent methanol was placed on an acid-washed alumina column and the activity then eluated in 100 ml. fractions collected from 3000 ml. of 80 percent methanol. Fractions 5 to 30 were combined, concentrated in vacuo to remove the methanol, and freeze-dried to yield 320 mg. of crude product having 4 to 5 times the activity of the crude almarcetin.

An aqueous solution of almarcetin combined from several alumina columns (467 mg., in 40 ml. H₂O) was placed on a weakly acidic cation exchange column "Amberlite IRC-50 (H+)" Rhom and Haas. The almarcetin was displaced from the column with water (1700 ml.) which was freeze-dried to yield 280 mg. of partially purified almarcetin that was 1.5 times as active as the product from the alumina column. The partially purified antibiotic complex still contained traces of purine.

A 104 mg. aliquot of the lyophilized almarcetin from the IRC-50 (H+) column was dissolved in water (20 ml.) and placed on a strongly acidic, sulfonic acid type cation exchange column, "Amberlite IR-120 (H+)." Water (250 ml.) was used to wash the antibiotic from this column. The effluent was collected in 25 ml. fractions and the pH of each fraction was determined. All fractions of pH less than 6 were neutralized immediately by stirring for 10 minutes with 1 ml. of a weakly basic anion exchange resin, i.e., "Amberlite IR-4B (OH⁻)." Fractions 2 to 5 were freeze-dried to yield 21 mg. of the antibiotic whose chromatograms showed no trace of purine. The almarcetin was 1.5 times as active as that obtained from the weakly acidic carboxylic acid column and represented an overall purification of 225 fold.

As shown in Table 2, when the highly purified almarcetin complex (40 μg.) was paper chromatographed in water-saturated 1-butanol and the chromatograms bioautographed against *Agrobacterium tumefaciens* it provided four zones of inhibition: factor A, $R_f$ of 0.45; factor B, $R_f$ of 0.30; factor C, $R_f$ of 0.14; and factor D, $R_f$ of 0.09. Bioautography of almarcetin (120 μg.) in the same solvent but against *Bacillus subtilis*, *Mucor ramannianus*, and *Xanthomonas phaseoli*, gave only one zone of inhibition: $R_f$ 0.47, presumably factor A. Factors B, C. and D may be inactive against these three organisms or they may be present at a concentration too low to be detected. In water-saturated 1-butanol containing 2 percent p-toluensulfonic acid and 2 percent piperidine the $R_f$ value of almarcetin on bioautography against *A. tumefaciens* was 0.30; against *B. subtilis* 0.34; against *H. ramannianus* 0.32; and against X. phaseoli 0.31. Using 1-butanol-saturated water, and $R_f$ values for the organisms were 0.82, 0.82, 0.78, and 0.82. All the factors absorbed in the U.V. and could be located with light having a wavelength of 253.7 mμ.

TABLE 1.—IN VITRO ACTIVITY OF ALMARCETIN

| Organism: | Minimal inhibitory concentration [1] μg./ml. |
|---|---|
| Gram-negative rods | |
| *Aerobacter aerogenes* NRRL B-199 | 100 |
| *Agrobacterium tumefaciens* NRRL B-36 (crown gall) | 0.1 |
| *Alcaligenes* NRRL B-962 (Bodenheimer's bacillus) | >100 |
| *Bordetella bronchiseptica* NRRL B-140 (pneumonia in dogs, cats, rabbits) | 100 |
| *Escherichia coli* NRRL B-766 | 10 |
| *Proteus vulgaris* NRRL B-417 | 100 |
| *Pseudomonas aeroginosa* NRRL B-23 | >100 |
| *Pseudomonas phaseolicola* NRRL B-845 (bean blight) | 1.0 |
| *Serratia amarcescens* NRRL B-284 | >100 |
| *Xanthomonas Campestris* NRRL B-1459 | 100 |
| *Xanthomonas phaseoli* NRRL B-1460 (pinto bean blight) | 100 |
| Acid-fast rods | |
| *Mycobacterium phlei* NRRL B-610 (abscesses in guinea pigs) | 1.0 |
| *Mycobacterium* NRRL B-692 | 100 |
| Gram-positive rods | |
| *Bacillus subtilis* NRRL B-765 | 10 |
| Gram-positive cocci | |
| *Staphylococcus aureus* NRRL B-313 (abscesses, boils) | 100 |
| *Sarcina lutea* NRRL B-1018 | 100 |
| Yeasts | |
| *Candida albicans* NRRL Y-477 (moniliasis) | >100 |
| *Saccharomyces pastorianus* NRRL Y-139 | 10 |
| Fungi | |
| *Alternaria solani* NRRL 2325 (potato blight) | 100 |
| *Fusarium oxysporum* var. *lycopersici* NRRL 1985 | >100 |
| *Mucor ramannianus* NRRL 1839 | >100 |
| *Trichoderma viride* NRRL 1700 | >100 |
| *Verticillium algo-atrum* NRRL 1204 (wilt disease in plants) | 10 |
| *Ustilago maydis* NRRL 2321 (corn smut) | 100 |

[1] Determined by agar dilution-streak method.

TABLE 2.—$R_f$ VALUES OF ALMARCETIN FACTORS BY BIOAUTOGRAPHY OF PAPER CHROMATOGRAMS

| Organism | Solvent system * | | | | |
|---|---|---|---|---|---|
| | I | II | III | IV | V |
| *Agrobacterium tumefaciens* NRRL B-36.† | 0.09(D), 0.14(C), 0.30(B), 0.45(A) | 0.17, 0.34, 0.46 | 0.30 | 0.82 | 0.0 |
| *Bacillus subtilis* NRRL B-765 | 0.47 | 0.46 | 0.34 | 0.82 | 0.0 |
| *Mucor ramannianus* NRRL 1839 | 0.47 | 0.41 | 0.32 | 0.78 | 0.0 |
| *Xanthomonas phaseoli* NRRL B-1460 | 0.47 | 0.46 | 0.31 | 0.82 | 0.0 |

*Solvent systems: (I) water-saturated 1-butanol; (II) 2 g. p-toluenesulfonic acid per 100 ml. water-saturated 1-butanol; (III) water-saturated 1-butanol containing 2 g. p-toluenesulfonic acid and 2 ml. piperidine per 100 ml.; (IV) 1-butanol-saturated water; (V) water-saturated methylisobutyl ketone.

†When *A. tumefaciens* was the assay organism, 40 μg of almarcetin was chromatographed; when other organisms were used, 120 μg was chromatographed.

The parenthesized capitals shown for *A. tumefaciens* in Solvent I denote the specific factor, in Solvent II there were only three zones of inhibition and their factorial natures were presumed; in Solvents III and IV *A. tumefaciens* gave only one zone of inhibition; in Solvent V the almarcetin did not migrate. The other organisms showed only single zones of inhibition.

We claim:
1. A process for obtaining an antibiotic complex that exhibits marked in vitro activity against the bacteria causing plant crown gall disease and halo blight of black beans, said process comprising:
(a) inoculating a neutralized fermentation medium containing only carbon and nitrogen sources with a vegetative culture of *Streptomyces albus* substrain NRRL B–3141;
(b) incubating the inoculated medium for 7 days at 28° C. under aerobic conditions;
(c) filtering off the mycelium to obtain a clear culture liquid;
(d) adsorbing the crude antibiotic complex on activated carbon;
(e) washing the complex-containing carbon sequentially with water, acidified 80 percent methanol, and absolute methanol;
(f) eluting said complex from the carbon with 80 percent acetone;
(g) concentrating the eluate to drive off the acetone;
(h) removing further impurities on acid-washed alumina;
(i) subjecting an aqueous solution of the partially purified antibiotic complex to treatment with acidic cation exchange resins;
(j) lyophilizing the resulting solution of highly purified antibiotic complex.

2. The antibiotic complex obtained by the process of claim 1, said complex being an acidic polypeptide consisting of an equilibrium of two interconvertible major factors and two minor factors in association therewith, $R_f$ values of said factors in water-saturated 1-butanol solvent being respectively 0.45, 0.30, 0.14, and 0.09, said complex being further characterized by a U.V. absorption maximum at 300 m$\mu$ in water ($E_1^{1\%}$ cm.=450) with a weak shoulder at 270 m$\mu$, by being soluble in water, aqueous methanol, aqueous ethanol, and in aqueous acetone, by being only slightly soluble in absolute methanol and in absolute ethanol, and by being insoluble in acetone and in ethyl acetate.

References Cited
UNITED STATES PATENTS 3,067,099 12/1962 McCormick et al. ----- 167—65
3,126,317 3/1964 Heinemann et al. ------ 167—65

ALBERT T. MEYERS, *Primary Examiner.*

D. M. STEPHENS, *Assistant Examiner.*